March 28, 1967  J. M. WILLIS ET AL  3,311,151
PNEUMATIC TIRE
Filed May 23, 1966
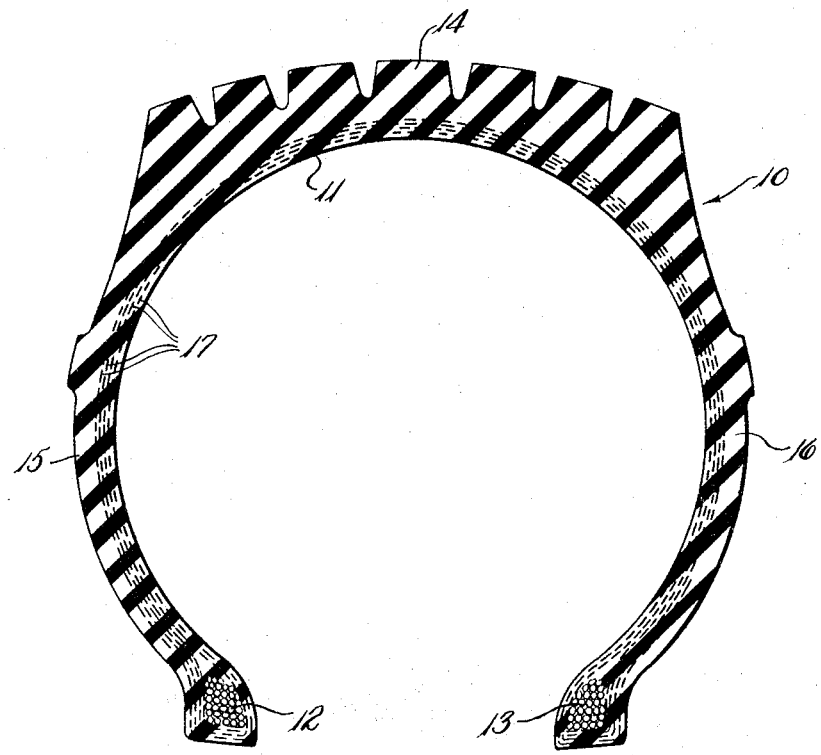

United States Patent Office 3,311,151
Patented Mar. 28, 1967

3,311,151
PNEUMATIC TIRE
James M. Willis and Ronald L. Denecour, both of Akron, Ohio, assignors to The Firestone Tire & Rubber Company, Akron, Ohio, a corporation of Ohio
Filed May 23, 1966, Ser. No. 559,654
16 Claims. (Cl. 152—330)

This application is a continuation-in-part of copending application Ser. No. 362,624, filed Apr. 27, 1964 and now abandoned.

This invention relates, as indicated, to pneumatic tires, and more particularly to improved pneumatic tires in which one or more of the rubber tire components thereof comprises a blend of butyl rubber and a terpolymer rubber including polymer units derived from ethylene and propylene, e.g., a blend of an ethylene-propylene terpolymer and a butyl rubber. The invention also relates to a tire having a butyl rubber tread and a body comprising butyl rubber and an ethylene-propylene terpolymer, and it more particularly relates to a pneumatic tire in which at least one component thereof comprises an ethylene-propylene terpolymer rubber in which the third monomer utilized in forming the terpolymer is a non-conjugated diene, blended with butyl rubber, which is well known to be a copolymer of a major portion of isobutylene and a minor portion of isoprene or butadiene.

Essentially, this invention is in a tire construction in which the components of the tire provide greatly improved service, particularly in respect to resistance to atmospheric elements; e.g., actinic light, ozone, etc.; resistance to abrasive wear, and integrity of the tire as a whole as reflected in its ability to withstand over prolonged periods of time severe conditions without ply separation, for example, or tread separation. These improved tires provide excellent ride and traction characteristics coupled with a high degree of durability. These improvements are noted when the tire is constructed of elements in which a principal elastomeric component includes a blend of a terpolymer of ethylene, propylene and a non-conjugated diene, such rubbers being generally designated by the initials EPT which stand for ethylene-propylene-terpolymer. Ethylene-propylene terpolymer rubbers are known, and have varying amounts of ethylenic unsaturation, generally in the range of from 0.5% to 5.0% such unsaturation. The amount of unsaturation affects the cure rate of the rubber and should be in the higher concentrations for lower Mooney (ML/4/212° F.=50) rubbers. The ratio of ethylene to propylene is usually in the range of from 70:30 to 30:70, respectively. Specific EPT rubbers are ethylene/propylene/dicyclopentadiene (64:36:5.3); (ML/4/212° F.=86); ethylene/propylene/1,4 - hexadiene (62:38:4.2) (ML/4/212° F.=86); ethylene/propylene/2 methylene-5-norbornene (55.45:4.7) (ML/4/212° F.= 107) etc. An especially satisfactory tire is formed using tire construction elements commonly used in tire building practice, with the modification that some elements are formed from a blend of an EPT type rubber and butyl rubber. These blends extend over a range of elastomer ratios including one part of EPT rubber to 5 parts of butyl rubber, to 5 parts of EPT rubber to one of butyl rubber. The entire tire may be composed of a blend, or of different blends of an ethylene-propylene terpolymer with butyl rubber. Most usually, these blends are formulated within the range of from 3 parts of EPT rubber to 1 part of butyl rubber, to 3 parts of butyl rubber to 1 part of EPT rubber. These rubber materials are readily extended with oil up to concentrations of as high as 150 parts of oil per 100 parts of rubber. The usual amount of oil is between about 20 to about 80 parts per 100 of rubber (phr.). The rubbers hereof, particularly those containing EPT in amounts of 25% to 80% of the elastomeric moiety, any balance being butyl rubber, have a high tolerance for oil and carbon black particularly useful in tread and body stocks. Improved adhesion to bead wire is also obtained with blended EPT-butyl rubber. Use of 25% or more EPT in a butyl tread greatly increases abrasion resistance while retaining the ride characteristics and wet pavement traction of 100% butyl tread.

Also, very satisfactory results have been obtained in the fabrication of tires from tire component parts where the body component is made up of fabric or reinforcing elements insulated with stock based on butyl rubber as the only elastomer, or a blend of EPT rubber with butyl rubber, and the tread portion is formed from an EPT-butyl rubber blend. Thus, the component parts of the tire may demonstrate variation in composition ranging through various blends of EPT rubber and butyl rubber, to 100% butyl rubber, for a portion of the components, a characterizing feature of the tires of the present invention being the presence of both EPT rubber and butyl rubber in at least one of the tire components.

The tires embodying this invention are easy and economical to manufacture, and require no special manufacturing methods. They can be readily shaped and vulcanized by conventional procedures.

These advantages and other objects and advantages of the invention will be more readily apparent from a description of the several forms of the invention, reference being had to the accompanying drawing in which there is shown a sectional view, taken in a radial plane of a tire embodying the present invention.

The invention is described with reference to the annexed drawing as embodied in a 7.50–14 passenger car tire, but it will be apparent that it will be useful in other types of tires both for highway and off the road use, and in tires for other vehicles and other conditions and types of service.

In FIG. 1 there is shown a section of a pneumatic tire generally indicated at 10 and comprised of a rubberized fabric body portion 11 terminating at its two edges in two inextensible bead portions 12 and 13. A rubbery tread portion 14 is superimposed and bonded as by vulcanization to reinforced fabric portion 11, and rubbery sidewalls 15 and 16 extend from respective edges of the tread portion 14 along the fabric body 11 to which they are bonded, to the bead portions 12 and 13. A fabric formed of tire cord and indicated by dotted lines identified with the number 17 may be formed from conventional nylon cord, or a cord formed from another synthetic or naturally occurring fibrous materials, e.g., cotton. Specifically, the cord portion may be formed in the manner described in Patent No. 2,991,818 wherein the cord 17 is a reinforcing element for the rubber body portion 11 and formed from three strands. Each strand is composed of two filament yarns twisted to hold them in the desired shape. Where the tire is constructed of 4 plies of rubberized fabric, the nylon cord fabric used therein is conventionally an 840/2 nylon cord fabric. The number 840 denotes the denier of the nylon yarn whereas the number 2 denotes the number of yarns of 840 denier twisted together to form a cord. Patent No. 2,991,818 teaches a tire containing only 2 body plies instead of 4. In such case then 840–2/3 rubberized nylon cord fabric can be used as the ply in a 2 ply tire. The symbol 840–2/3 indicates a cord formed from 3 strands twisted together, each strand composed of two yarns of 840 denier folded together. Other suitable nylon cords for the body of a 2 ply tire are 1260/2 and 1260/3 cords. Suitable rayon cords for a 2 ply tire are 2200/3 and 2200/2 cords.

The plies from which the tire is formed may include reinforcing elements running radially, circumferentially, or alternate plies may be so disposed as to have reinforcing elements crossing each other at equal angles with respect to an imaginary circumferential line about the tire. In another modification, the reinforcing elements, wire or textile, instead of being in a webbing relation within the ply, may be disposed as discontinuous discrete short fibers from 0.5 to 3 inches long and oriented in one direction in any given ply. A tread portion may include a plurality of laminates in which discrete fibers are oriented unidirectionally and in criss-crossed relation between successive lamina.

The ability of fibrous material to reinforce a rubber article is greatly enhanced by coating the reinforcing element with a coating composition which upon drying at an elevated temperature provides a coating or film which includes an infusible, insoluble polyhydric phenol-aldehyde resin, and in intimate admixture therewith, an elastomer which includes polymer units derived from ethylene and propylene. Particularly useful are the ethylene-propylene terpolymers in which the third monomer providing a polymer unit is preferably a non-conjugated diene.

A particularly satisfactory dip composition for tire cord is produced in accordance with the following formulation:

| | Parts |
|---|---|
| Ethylene-propylenedicyclopentadiene latex (43.5% solids) (50:50:3) | 140 |
| Resorcinol commercial grade | 8.6 |
| Formaldehyde | 5.1 |
| Sodium hydroxide | 0.6 |
| Reinforcing carbon black | 3.5 |
| Zinc oxide | 2.0 |
| Water | 245 |

In producing the adhesive dip composition, the carbon black is dispersed in water to produce a commercially available carbon black dispersion. In like manner the zinc oxide is also dispersed in water to the extent of about 50% by weight to produce a commercially available zinc oxide dispersion. The sodium hydroxide is dissolved in water to produce a 50% aqueous solution. The resorcinol and formaldehyde are dissolved in about ⅔ of the water and the sodium hydroxide solution added with stirring. The resin forming composition is then added to the latex with good stirring. The carbon black dispersion, which is normally commercially available at about 35% concentration as a reinforcing carbon black dispersion is diluted with half the remaining water and added to the latex-resin reactant composition. The zinc oxide dispersion is diluted with the balance of the water and is also added to the mixture. The resultant composition has a pH of about 8.35. This composition may be used directly as an adhesive dip for tire cord material such as nylon, Dacron, cotton, rayon, etc. to produce reinforcing elements for the tires of the present invention. After dipping the reinforcing element is treated by conventional means to remove excess dip composition, and then dried in an oven to infusibilize and insolubilize the resin, and remove the aqueous medium.

It becomes convenient at this point to further illustrate the present invention by giving specific examples of rubber composition formulations for the component parts of tires produced in accordance with this invention. Where reinforcing tire cord elements are used in building the tires, they are previously dipped in a dip composition similar to that illustrated above. It is to be understood that the following examples are illustrative only of compositions useful in forming tire components. These tire components may be assembled in a complete tire in a variety of ways as will be hereinafter more particularly described. The mode of mixing the ingredients of the rubber composition illustrated in Table I is conventional and well known to those skilled in the art, although the compositions themselves are new. Conventional mixing equipment, e.g., a Banbury mixer, is used for this purpose.

TABLE I

| Ingredient | Rubber Composition No. | | | | | |
|---|---|---|---|---|---|---|
| | 1 | 2 | 3 | 4 | 5 | 6 |
| | Tread | Inner-liner | Tread | | | |
| EPT (1)[1] | | | 50 | | | |
| EPT (2)[1] | 75 | | | | | |
| EPT (3)[1] | | 25 | | 50 | 25 | |
| Butyl rubber | 25 | 75 | 50 | 50 | 75 | 100 |
| N-methyl-N,4-dinitrosoaniline | 0.15 | 0.25 | 0.17 | 0.17 | 0.25 | 0.33 |
| Clay (Suprex) | 0.33 | 0.50 | 0.33 | 0.33 | 0.50 | 0.67 |
| High abrasion furnace black | 65 | | | | | |
| Super abrasion furnace black | | 52 | 52 | 52 | 52 | 48 |
| Low structure high abrasion furnace black | | | | | | |
| Medium thermal black | | | | | | |
| Medium processing oil | 30 | 30 | 30 | 30 | 30 | 10 |
| Tackifier-phenol-aldehyde resin | | | | | | 1.0 |
| Stearic acid | | | | | | |
| Zinc oxide | 5 | 5 | 5 | 5 | 5 | 5 |
| Sulfur | 1.5 | 1.50 | 1.50 | 1.25 | 1.50 | 2.0 |
| Tetramethylthiuram disulfide | 1.2 | 1.50 | 1.50 | 0.75 | 1.50 | |
| Mercaptobenzothiazole | 0.5 | 0.50 | 0.50 | 0.50 | 0.50 | |
| Tellurium dimethyldithiocarbamate | | | | | | 0.96 |
| 2,2'-dithiobis (benzothiazole) | | | | | | 1.0 |
| Total | 203.68 | 191.25 | 191 | 190 | 191.25 | 168.96 |

| Ingredient | Rubber Composition No. | | | | | | |
|---|---|---|---|---|---|---|---|
| | 7 | 8 | 9 | 10 | 11 | 12 | 13 |
| | Tread | | Sidewall | | | | |
| EPT (1)[1] | 67 | | 50 | | | 25 | |
| EPT (2)[1] | | | | | | | |
| EPT (3)[1] | | 75 | | 50 | 25 | | 75 |
| Butyl rubber | 33 | 25 | 50 | 50 | 75 | 75 | 25 |
| N-methyl-N,4-dinitrosoaniline | 0.1 | 0.1 | 0.17 | 0.17 | 0.25 | | 0.1 |
| Clay (Suprex) | 0.2 | 0.2 | 0.33 | 0.33 | 0.50 | | 0.2 |
| High abrasion furnace black | 65 | | | | | 65 | |
| Super abrasion furnace black | | 50 | 52 | 52 | 52 | | 50 |
| Low structure high abrasion furnace black | | | | | | | |
| Medium thermal black | | | | | | | |
| Medium processing oil | 40 | 30 | 30 | 30 | 30 | 40 | 30 |
| Tackifier-phenol-aldehyde resin | | | | | | | |
| Stearic acid | 1 | | | | | 1 | |
| Zinc oxide | 5 | 5 | 5 | 5 | 5 | 5 | 5 |
| Sulfur | 2 | 1.75 | 1.50 | 1.25 | 1.50 | 2 | 1.75 |
| Tetramethylthiuram disulfide | | 2.0 | 1.50 | 0.75 | 1.50 | | 2.0 |
| Mercaptobenzothiazole | | 0.5 | 0.50 | 0.50 | 0.50 | | 0.5 |
| Tellurium dimethyldithiocarbamate | 1 | | | | | 1 | |
| 2,2'-dithiobis (benzothiazole) | 1 | | | | | 1 | |
| Total | 215.3 | 189.55 | 191.00 | 190.00 | 191.25 | 215 | 189.55 |

| Ingredient | Rubber Composition No. | | | |
|---|---|---|---|---|
| | 14 | 15 | 16 | 17 |
| | Body | | | Bead Insul. |
| EPT (1)[1] | | | | 75 |
| EPT (2)[1] | | | | |
| EPT (3)[1] | 75 | | 50 | |
| Butyl rubber | 25 | 100 | 50 | 25 |
| N-methyl-N,4-dinitrosoaniline | 0.1 | .33 | 0.17 | |
| Clay (Suprex) | 0.2 | .67 | 0.33 | 40 |
| High abrasion furnace black | | | | 50 |
| Super abrasion furnace black | 50 | | 52 | |
| Low structure high abrasion furnace black | | 52 | | |
| Medium thermal black | | | | 20 |
| Medium processing oil | 30 | 8 | 30 | 20 |
| Tackifier-phenol-aldehyde resin | | 4.9 | 5 | |
| Stearic acid | | | | 1 |
| Zinc oxide | 5 | 5.0 | 5 | 5 |
| Sulfur | 1.75 | 2.3 | 1.5 | 2 |
| Tetramethylthiuram disulfide | 2.0 | | 1.75 | |
| Mercaptobenzothiazole | 0.5 | | 0.50 | |
| Tellurium dimethyldithiocarbamate | | 1.2 | | |
| 2,2'-dithiobis (benzothiazole) | | 1.0 | | 1 |
| Rosin pentaerythritol ester | | 2.1 | | 1 |
| Total | 189.55 | 177.50 | 196.25 | 240 |

[1] Numbers in ( ) indicate different commercial grades.

In the foregoing table, several examples of "EPT" have been cited for use in forming the blends hereof, each representing a different commercially available EPT rubber. Table II below specifies the specific elastomers. The accelerator, reinforcing elements, antioxidants, plasticizing or extending materials, and the vulcanizing agents are illustrated by well known materials, and it will be understood that other examples of these materials as well as other additive materials commonly used in rubber formulations, well known to those skilled in the art, may be substituted in whole or in part for the corresponding materials illustrated in Table I.

TABLE II

| | EPT No. | | |
|---|---|---|---|
| | (1) | (2) | (3) |
| | Termonomer | | |
| | Dicyclopentadiene | 1,4-hexadiene | 2-methylene-5-norbornene |
| Percent Termonomer Content | 5.3 | 4.2 | 4.7 |
| Ethylene/Propylene | 68/36 | 62/38 | 55/45 |
| ML/4/212° F | 86 | 86 | 107 |

Example I

A 7.50–14 size tire was formed from tread composition No. 4, sidewall composition No. 10, body composition No. 16, the body portion being reinforced with rayon which had previously been dipped in an EPT based dip composition such as that described above. On an indoor durability machine such a tire inflated to 50 p.s.i. ran a total of 224.3 hours at 30 m.p.h. under a load of 925 lbs. for a total of 6,953 miles. This tire showed failure by separation in the body stocks between the fourth plies.

Example II

Another tire of the same size, loading and inflation tested on the same machine and formed from component parts having compositions of that corresponding to rubber composition Nos. 5 and 11 for the tread and sidewall respectively, and a body in accordance with composition No. 16 ran a total of 327 hours for a total of 10,134 miles. Failure was by separation in the body stock between the third and fourth plies.

Example III

By comparison a 100% butyl tire utilizing a butyl latex dipped rayon cord, tested under the same conditions, ran a total of 105.2 hours for a total of 3,267 miles. The nature of the failure was separation of the third and fourth ply body stocks from the cord.

Example IV

In order to measure the abrasion resistance of tire tread compositions illustrative of the invention, stock No. 4 (Table I) was applied as the tread on 7.50–14 tires. Using the same carcass construction control tires were treaded with 100% butyl rubber stock loaded with low structure high abrasion furnace black. After 12,000 miles at 60 m.p.h. the stock containing EPT had a wear index of 125 compared to 100 for the butyl rubber control treads based on average miles traveled per 0.001 inch skid depth lost. When sets of tires of these two constructions were driven under normal road conditions, it was found that the tires treaded with stock No. 4 gave the same soft ride as the butyl rubber treaded controls. Both sets were essentially free from braking and cornering "squeal."

The foregoing tests are exemplary of those demonstrating a marked superiority in tires formed from stock materials characterized by the presence therein of elastomeric material including polymer units derived from ethylene and propylene, and a diene. Such elastomeric materials demonstrate a high durability abrasion resistance, and are superior in life and running characteristics to tires presently commercially available. Butyl rubber as a material for use throughout the tire does not stand up too well under heavy duty. However, a tire having a butyl tread, or butyl body, in a tire, the balance of the components of which are formed with a rubber composition which is a blend of EPT and butyl, may be used. Replacement of the tread or body stock with rubber stock which is a blend of EPT rubber with butyl rubber along with the aforementioned EPT cord dip provides improved durability of the carcass in heavy duty service and in wear.

It has been found, therefore, that compositions including significant proportions of EPT rubber in combination with butyl rubber impart improved characteristics in respect of durability and wear under heavy duty while retaining the soft ride.

It is further significant that EPT in combination with butyl rubber readily lends itself to processing by procedures and apparatus which is established for styrene-butadiene rubber containing tires. EPT rubber in combination with butyl rubber readily accepts cheap processing oils in the stocks thus effecting a decrease in cost.

What we claim is:

1. In a pneumatic tire comprising a vulcanized rubber body portion including reinforcing elements embedded therein and terminating at its two edges in two inextensible beads, a vulcanized rubber tread portion over-lying and bonded to said body portion, and a pair of integral vulcanized rubber sidewall portions extending from respective edges of the tread portion along the body portion to which they are bonded to the respective beads, the improvement which comprises at least one of said rubber portions formed from a blend of an elastomeric terpolymer including polymer units derived from ethylene, propylene and a non-conjugated diene and a butyl rubber, said terpolymer including propylene in an amount ranging from about 30 to about 70 mole percent, the balance being ethylene and the non-conjugated diene, said terpolymer having a Mooney viscosity of at least about 50 (ML–4/212° F.).

2. An improved pneumatic tire in accordance with claim 1 in which the non-conjugated diene is dicyclopentadiene.

3. An improved pneumatic tire in accordance with claim 1 in which the non-conjugated diene is 2-methylene norbornene.

4. An improved pneumatic tire in accordance with claim 1 in which the non-conjugated diene is 1,4-hexadiene.

5. In a pneumatic tire comprising a vulcanized rubberized fabric body portion terminating at its two edges in two inextensible beads, a vulcanized rubber tread portion over-lying and bonded to said body portion, and a pair of integral vulcanized rubber sidewall portions extending from respective edges of the tread portion along the body portion to which they are bonded to the respective beads, the improvement which comprises a tread portion formed from a blend of elastomeric substances, one substance being a terpolymer including polymer units derived from ethylene, propylene, and a non-conjugated diene and the other being a butyl rubber, said terpolymer including propylene in an amount ranging from about 30 to about 70 mole percent, the balance being ethylene and the non-conjugated diene, said terpolymer having a Mooney viscosity of at least about 50 (ML–4/212° F.).

6. The improved tire of claim 5 in which the tread portion is formed from an elastomeric substance including polymer units derived from ethylene, propylene and a non-conjugated diene.

7. The improved tire of claim 5 in which the non-conjugated diene is dicyclopentadiene.

8. The improved tire of claim 5 in which the non-conjugated diene is 2-methylene norbornene.

9. The improved tire of claim 5 in which the non-conjugated diene is 1,4-hexadiene.

10. In a pneumatic tire comprising a vulcanized rubberized fabric body portion terminating at its two edges in two inextensible beads, a vulcanized rubber tread portion over-lying and bonded to said body portion, and a pair of integral vulcanized rubber sidewall portions extending from respective edges of the tread portion along the body portion to which they are bonded to the respective beads, the improvement which comprises a tire body portion formed from a blend of elastomeric substances, one substance being a terpolymer including polymer units derived from ethylene, propylene and a non-conjugated diene, and the other being a butyl rubber, said terpolymer including propylene in an amount ranging from about 30 to about 70 mole percent, the balance being ethylene and the non-conjugated diene, said terpolymer having a Mooney viscosity of at least about 50 (ML–4/212° F..

11. The improved tire of claim 10 in which the non-conjugated diene is dicyclopentadiene.

12. The improved tire of claim 10 in which the diene is 2-methylene norbornene.

13. The improved tire of claim 10 in which the diene is 1,4-hexadiene.

14. In a pneumatic tire comprising a vulcanized rubberized fabric body portion terminating at its two edges in two inextensible beads, a vulcanized rubber tread portion over-lying and bonded to said body portion, and a pair of integral vulcanized rubber sidewall portions extending from respective edges of the tread portion along the body portion to which they are bonded to the respective beads, the improvement which comprises a tread portion formed from a blend of elastomeric substances one of said substances being a terpolymer including polymer units derived from ethylene, propylene and a non-conjugated diene and the other of said elastomeric substances including polymer units derived from isobutylene and isoprene, said terpolymer including propylene in an amount ranging from about 30 to about 70 mole percent, the balance being ethylene and the non-conjugated diene, said terpolymer having a Mooney viscosity of at least about 50 (ML–4/212° F.).

15. In a pneumatic tire comprising a vulcanized rubberized fabric body portion terminating at its two edges in two inextensible beads, a vulcanized rubber tread portion over-lying and bonded to said body portion, and a pair of integral vulcanized rubber sidewall portions extending from respective edges of the tread portion along the body portion to which they are bonded to the respective beads, the improvement which comprises a tire body portion formed from a mixture of elastomeric substances, one of said elastomeric substances being a terpolymer including polymer units derived from ethylene, propylene and a non-conjugated diene and the other of said elastomeric substances including polymer units derived from isobutylene and isoprene, said terpolymer including propylene in an amount ranging from about 30 to about 70 mole percent, the balance being ethylene and the non-conjugated diene, said terpolymer having a Mooney viscosity of at least about 50 (ML–4/212° F.).

16. In a pneumatic tire comprising a vulcanized rubberized fabric body portion terminating at its two edges in two inextensible beads, a vulcanized rubber tread portion over-lying and bonded to said body portion, and a pair of integral vulcanized rubber sidewall portions extending from respective edges of the tread portion along the body portion to which they are bonded to the respective beads, the improvement which comprises a tread portion formed from a blend of an elastomeric substance which is a terpolymer including polymer units derived from ethylene, propylene and a non-conjugated diene and an elastomeric substance formed from isobutylene and isoprene; and a fabric body portion formed from a blend of an elastomeric substance which is a terpolymer including polymer units derived from ethylene, propylene and a non-conjugated diene and an elastomeric substance formed from isobutylene and isoprene; and including in reinforcing relation therewith, reinforcing elements formed from a synthetic fibrous material and having a coating thereon including an elastomer having polymer units derived from ethylene, propylene and a non-conjugated diene, the terpolymer in each case including propylene in an amount ranging from about 30 to about 70 mole percent, the balance being ethylene and the non-conjugated diene, said terpolymer having a Mooney viscosity of at least about 50 (ML–4/212° F.).

References Cited by the Applicant

UNITED STATES PATENTS

| | | |
|---|---|---|
| 2,273,200 | 2/1942 | Hoff. |
| 2,933,480 | 4/1960 | Gresham et al. |
| 2,975,159 | 3/1961 | Weinmayr. |
| 3,136,739 | 6/1964 | Adamek et al. |
| 3,162,620 | 12/1964 | Gladding. |

FOREIGN PATENTS

| | | |
|---|---|---|
| 879,808 | 10/1961 | Great Britain. |
| 898,670 | 6/1962 | Great Britain. |
| 939,359 | 10/1963 | Great Britain. |

OTHER REFERENCES

Chemical and Engineering News, Jan. 8, 1962, page 26.
Canadian Chemical Processing August 1962, pages 58–62.

ARTHUR L. LA POINT, *Primary Examiner.*

C. W. HAEFELE, *Assistant Examiner.*